July 24, 1962 E. H. HIGHAM 3,046,338

APPARATUS FOR CONTROLLING DICTATING MACHINES

Filed June 22, 1959 2 Sheets-Sheet 1

INVENTOR
Edward Hall Higham
by Brumbaugh, Free, Graves & Donohue,
Attorneys.

APPARATUS FOR CONTROLLING DICTATING MACHINES

Filed June 22, 1959 2 Sheets-Sheet 2

INVENTOR.
EDWARD HALL HIGHAM

BY his ATTORNEYS 3,046,338

APPARATUS FOR CONTROLLING DICTATING MACHINES

Edward Hall Higham, Sutton, England, assignor to Unilever Limited, Port Sunlight, England, a company of Great Britain Filed June 22, 1959, Ser. No. 821,790
Claims priority, application Great Britain June 30, 1958
7 Claims. (Cl. 179—2)

This invention relates to apparatus for controlling a dictating machine over telephone systems to which it is connected for speech transmission and, more particularly, to new and improved dictating machine control apparatus exhibiting reduced sensitivity to variations in the arrangement of the telephone system. One form of apparatus for remote control of a dictating machine over a telephone system, hereinafter referred to as apparatus of the type described, comprises means for producing and injecting into the telephone system an alternating current having cyclically or simultaneously a plurality of different predetermined component frequencies, a remote controller connected to the system in the vicinity of a dictator's telephone set for altering the value of the impedance presented by the system to said current from one to another of a plurality of impedance values, each of said frequencies having a particular impedance value selective to it, so that upon each alteration of impedance value the level of at least one of said components is changed; and a main station controller incorporating frequency selective networks adapted to selectively detect said levels and to be responsively connected to the dictating machine which is switchable in response to each said change in the levels of said components from one to another of a plurality of required conditions. An embodiment of an apparatus of the type described is disclosed in detail in the copending United States application of Logan, Serial No. 465,061, filed October 27, 1954, now U.S. Patent No. 2,979,568 and assigned to the same assignee as the present application.

The response of the apparatus of the type described is sensitive to differences in the characteristics of that part of the telephone system which connects the control oscillator with the remote controller. These differences are due to differences in the length of the telephone connection and/or to differences between different telephone connections independent of their length.

It is an object of the present invention to provide an apparatus in which the above mentioned sensitivity to differences in the characteristics of the telephone connection is reduced.

We have found that this object can be attained by substantially neutralizing the input to the frequency selective networks due to the current injected into the telephone system when the remote controller is not operated. By so doing, the effective input to the frequency selective network when the remote controller is not operated is very low and the change from this level to the level when the remote controller is operated is considerably increased. Consequently, differences between the characteristics of different telephone connections represent a much smaller fraction of the change of level due to operation of the remote controller.

The present invention therefore provides an apparatus for controlling dictating machines comprising means for producing an alternating current having a plurality of different frequency components, means for injecting that current into a telephone system, a remote controller connected to the system for altering the value of the impedance presented by the system to said current from one to another of a plurality of impedance values, each of said frequencies having a particular impedance value selective to it, a main station controller incorporating frequency selective networks responsive to changes in the level of said components, a signal source for producing an alternating current substantially identical to the first mentioned current, and a compensating network connected to the signal source and the frequency selective networks to substantially balance the input to the frequency selective networks due to the current injected into the telephone system when the remote controller is not operated.

Preferably, the signal source is constituted by the means for producing the first mentioned alternating current.

The compensating unit is preferably adapted to provide neutralization at the middle or one of the middle frequencies.

Embodiments according to the present invention will now be described with reference to the accompanying drawings in which.

Figure 4:
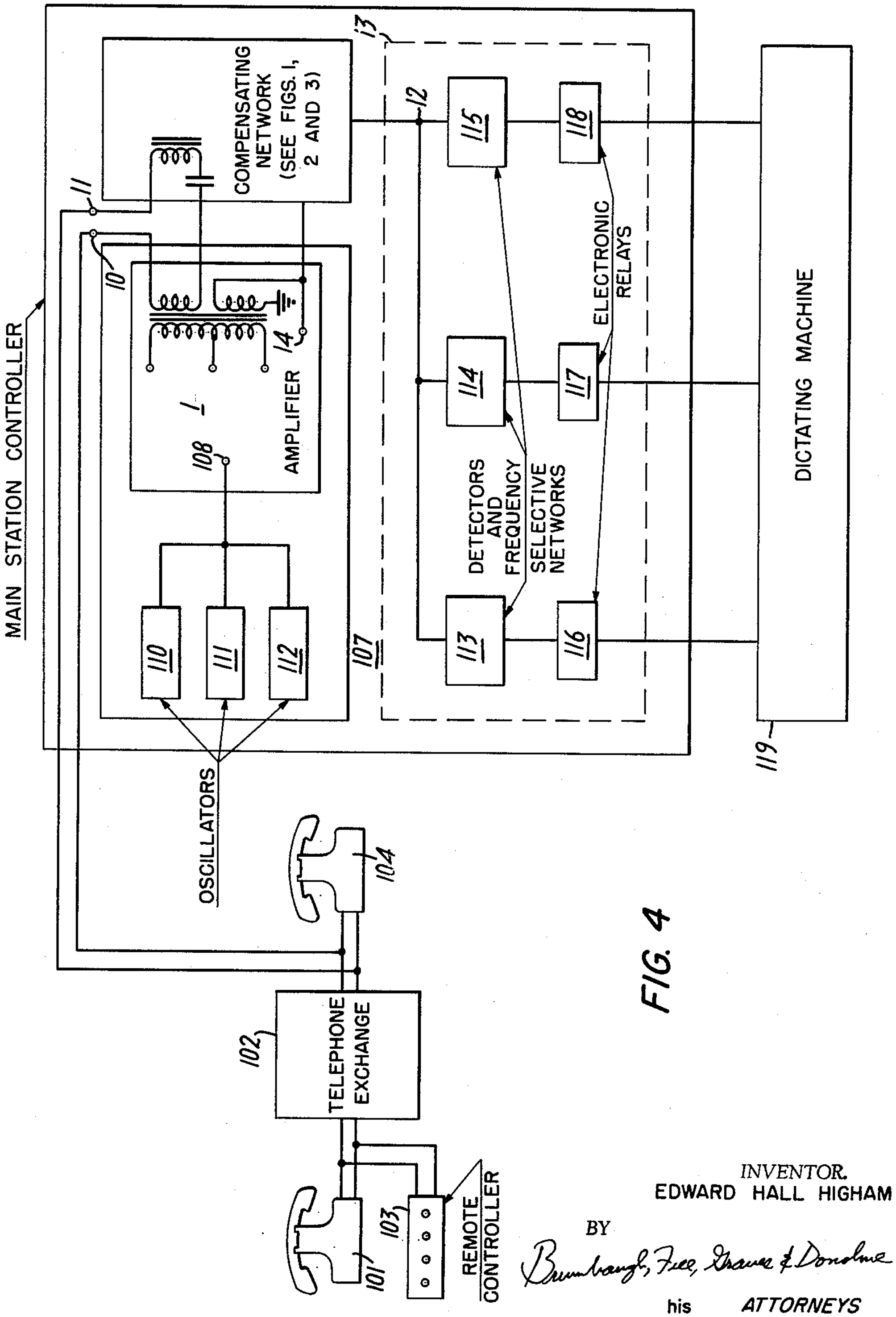
FIG. 4 shows a schematic diagram of a typical telephone system utilizing the invention.

In the embodiment described in the above identified Logan application with reference to the drawings accompanying that application, and as shown in FIG. 4 of this application, the means for producing the alternating current is in the form of three oscillators 110, 111 and 112 whose output is fed to the common input terminal 108 of an amplifier 1. As pointed out above, the telephone system with which the apparatus of the present invention is used also includes a dictator's telephone set 101, a remote controller 103 connected to the system in the vicinity of the dictator's telephone set for selectively altering the value of the impedance presented by the system to the currents from the three oscillators from one to another of a plurality of impedance values selective to it so that upon each alteration of impednace value the level of at least one of said currents is changed, and a main station controller 107 adapted to detect the changes in levels and to be responsively connected to a dictating machine 119 which is switchable in response to each change in level of the currents from one to another of a plurality of required conditions. The telephone system may also include the usual telephone exchange 102 and a local telephone set 104 in the vicinity of the main station controller 107 and the dictating machine 119. The main station controller 104 has three frequency selective networks, each network comprising a frequency selective amplifier followed by a detector rectifier 113, 114 or 115 and an electronic relay 116, 117 or 118. Effectively, the output of the amplifier 1 is injected into the telephone system in series with the input to the frequency selective networks. The electronic relays are used directly or indirectly to switch the dictating machine 119 to the required condition.

Figure 1:
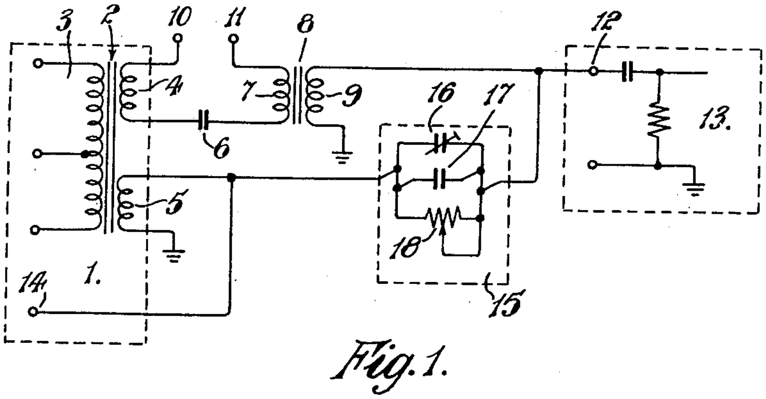
FIG. 1 shows a circuit diagram of the relevant parts of one embodiment.

Referring now to FIG. 1 of the accompanying drawing, the amplifier 1 is of the push-pull type and has an output transformer 2 having a centre tapped primary winding 3 and secondary windings 4 and 5. The secondary winding 4 is connected via a blocking condenser 6 and the primary winding 7 of a transformer 8 to the terminals 10 and 11 which are arranged to be connected to the telephone system. The transformer 8 has a secondary winding 9, one end of which is earthed, the other end being connected to the common input terminal 12 of the three frequency selective networks generally designated 13. The transformer windings must be arranged so that the voltage in winding 9 is antiphase to the voltage in winding 5.

One end of the secondary winding 5 is earthed, the other end is connected to the negative feed back terminal 14 of amplifier 1 and to one side of compensating network 15. Compensating network 15 comprises in parallel an adjustable capacitor 16, a fixed capacitor 17 and an adjustable resistor 18. The otther side of the compensating network 15 is connected to the common input terminal 12 of the three frequency selective networks.

As described in the above identified Logan application of the remote controller comprises three series resonant inductance-capacitance circuits which, by operation of push buttons, can be connected individually or in pairs across the telephone line.

In operation, the output of the amplifier 1 is injected into the telephone system via terminals 10 and 11 and supplied to the common input terminal 12 of the frequency selective networks 13. Assuming that the compensating network was not present, and that there were no other connections between the secondary winding 5 and and the input terminal 12, then a standing input would be applied to the input terminal 12. If one of the series resonant circuits of the remote controller is then connected across the telephone line, the impedance across terminals 10 and 11 is changed, thereby causing a change of level at the input terminal 12 which is detected by the corresponding detector.

The components of the compensating network are adjusted so that the input to the common terminal 12 due to the current flowing in the telephone system and hence through primary winding 7 of transformer 8 is neutralised. If the push button of the remote controller is then operated to connect one of the series resonant circuits across the telephone line, the current of the appropriate frequency flowing in the telephone circuit, and hence also in the primary winding 7 of transformer 8, increases. As the voltage from winding 5 is substantially constant independent of the load on the amplifier 1, the input of the terminal 12 is no longer neutralised. The change of level is detected by the corresponding frequency selective network and used to switch the dictating machine to the required condition. This change is considerably greater than if the standing input to the frequency selective selectors had not been neutralised.

Complete neutralisation at all three signalling frequencies would require an impedance 15 having a very complex combination of resistors, capacitors and inductors. In practice, neutralisation at the middle signalling frequency by means of a simple parallel combination of a resistor and a capacitor has been found adequate. The actual value of the components will depend on the combined characteristics of the telephone system, the transformers 2 and 8, the capacitor 6 and the frequencies used. In the particular embodiment shown, the frequencies were 20, 23 and 26 kc./s. The value of the variable capacitor 16 was 750 pf., that of capacitor 17 was 1200 pf. and that of variable resistor 18 was 100K ohms. The purpose of capacitor 6 is to prevent direct current from flowing through the windings 4 and 7. The value of capacitor 6 was .01 mfd. It is desirable that the leakage inductance of the transformers is of a very low order. In the embodiment described, the leakage inductance of transformer 2 was less than 6 millihenrys.

Figure 2:
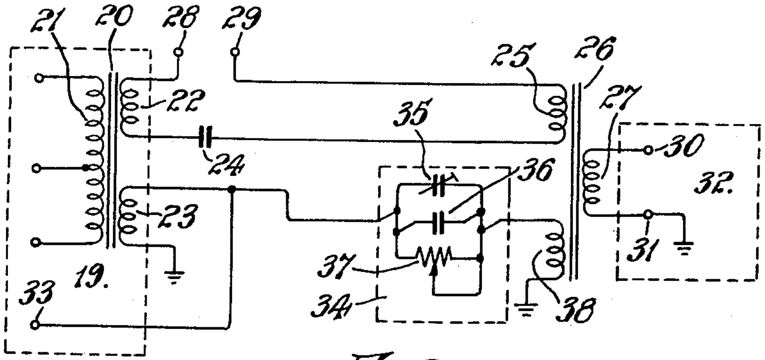
FIG. 2 shows a circuit diagram of the relevant parts of another embodiment.

An alternative but similar circuit is shown in FIG. 2. The amplifier 19 is of the push-pull type and has an output transformer 20 having a centre tapped primary winding 21 and secondary windings 22 and 23. The secondary winding 22 is connected via a blocking condenser 24 and a primary winding 25 of a transformer 26 to terminals 28 and 29 which are arranged to be connected to the telephone system. The transformer 26 has a secondary winding 27, one end of which is connected to the common input terminal 30 of the three frequency selective networks generally designated 32. The other end of winding 27 is connected to the earthed terminal 31. One end of the secondary winding 23 is earthed, the other end is connected to the negative feed back terminal 33 of amplifier 19 and to one side of the compensating network 34. The windings of transformer 26 must be arranged so that the voltage in winding 38 is antiphase to the voltage in winding 23. Compensating network 34 comprises in parallel an adjustable capacitor 35, a fixed capacitor 36 and an adjustable resistor 37. The other side of the compensating network 32 is connected to one end of secondary winding 38 of transformer 26, the other end of that secondary winding being earthed. The operation of this circuit is substantially the same as that described with reference to FIG. 1.

Figure 3:
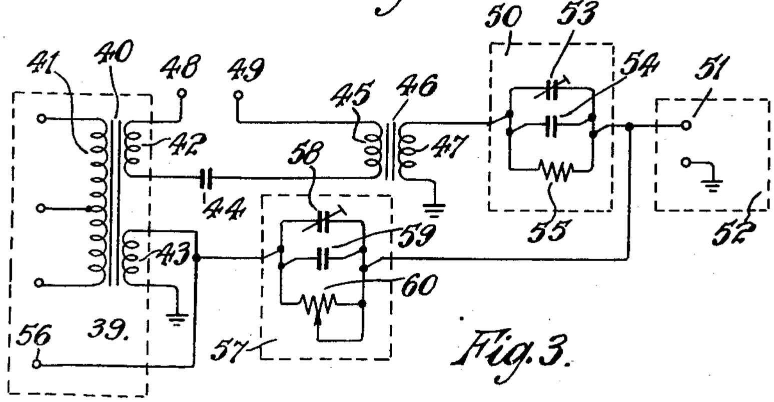
FIG. 3 shows a circuit diagram of the relevant parts of yet another embodiment.

An alternative circuit is shown in FIG. 3. Whereas the two circuits described above are essentially current balance systems, the embodiment shown in FIG. 3 is essentially a voltage balance system. This embodiment comprises an amplifier 39 of the push-pull type having an output transformer 40 having a centre tapped primary winding 41 and secondary windings 42 and 43. The secondary winding 42 is connected via a blocking condenser 44 and a primary winding 45 of a transformer 46 to terminals 48 and 49 which are arranged to be connected to the telephone system. The transformer 46 has a secondary winding 47 one end of which is earthed, the other end of which is connected via a compensating network 50 to the common input terminal 51 of the three frequency selective networks generally designated 52. The windings of transformer 46 must be arranged so that the voltage in winding 47 is antiphase to the voltage in winding 43. The compensating network 50 comprises in parallel an adjustable capacitor 53, a fixed capacitor 54 and an adjustable resistor 55. One end of the secondary winding 43 is earthed, the other end is connected to the negative feed-back terminal 56 of amplifier 39 and to one side of compensating network 57.

The compensating network 57 comprises in parallel an adjustable capacitor 58, fixed capacitor 59 and adjustable resistor 60. The other side of the compensating network 57 is connected to the common input terminal 51. Thus this system may be regarded as a special type of bridge network in which two generators (namely secondary windings 43 and 47) form two adjacent arms of the bridge and the compensating networks 50 and 57 form the other two adjacent arms of the bridge, the output being taken from between the common point of the generators and the common point of the compensating networks 50 and 57.

What is claimed is:

1. Apparatus for controlling dictating machines comprising means for producing an alternating current having a plurality of different frequency components, means for injecting that current into a telephone system, a remote controller connected to the system for altering the value of the impedance presented by the system to said current from one to another of a plurality of impedance values, each of said frequencies having a particular impedance value selective to it, a main station controller incorporating frequency selective networks responsive to changes in the level of said components, a signal source for producing an alternating current substantially identical to the first mentioned current, and a compensating network connected to the signal source and the frequency selective networks to substantially balance the input to the frequency selective networks due to the current injected into the telephone system when the remote controller is not operated.

2. Apparatus as claimed in claim 1 in which the compensating network is adapted to provide neutralisation at the middle or one of the middle frequencies.

3. Apparatus as claimed in claim 2 in which the compensating network is a parallel resistance-capacity network.

4. Apparatus for controlling dictating machines comprising means for producing an alternating current having a plurality of different frequency components, means for injecting that current into a telephone system, a remote controller connected to the system for altering the value of the impedance presented by the system to said current from one to another of a plurality of impedance values, each of said frequencies having a particular impedance value selective to it, a main station controller incorporating frequency selective networks responsive to changes in the level of said components and a compensating network, said compensating network being connected to the means for producing the alternating current and the frequency selective networks to substantially balance the input to the frequency selective networks due to the current injected into the telephone system when the remote controller is not operated.

5. Apparatus for controlling dictating machines comprising a telephone system, means for producing an alternating current having a plurality of different frequency components, said means having an output transformer having at least one primary and two secondary windings, a second transformer having at least one primary and one secondary winding, one secondary winding of the output transformer being connected in series with the primary winding of the second transformer to the telephone system, a remote controller connected to the system for altering the value of the impedance presented by the system to said current from one to another of a plurality of impedance values, each of said frequencies having a particular impedance value selective to it, a main station controller incorporating frequency selective networks responsive to changes in the level of said components, a compensating network, said compensating network being connected to the frequency selective networks and through the second of the secondary windings of the output transformer to the signal means to substantially balance the input to the frequency selective networks due to the current injected into the telephone system when the remote controller is not operated.

6. Apparatus as claimed in claim 5 in which the second transformer has a second primary winding and the compensating network is connected to the frequency selective networks via that second primary winding.

7. Apparatus as claimed in claim 5 including a second compensating network, said second compensating network being connected between the secondary winding of the second transformer and the input to the frequency selective networks, that secondary winding and the second secondary winding of the output transformer forming two adjacent arms of a bridge circuit and the two compensating networks forming the other two arms.

No references cited.